(12) United States Patent
Boyer et al.

(10) Patent No.: US 11,716,347 B2
(45) Date of Patent: Aug. 1, 2023

(54) MALICIOUS SITE DETECTION FOR A CYBER THREAT RESPONSE SYSTEM

(71) Applicant: Darktrace Limited, Cambridge (GB)

(72) Inventors: John Anthony Boyer, Cambridge (GB); Matthew Dunn, Ely (GB)

(73) Assignee: Darktrace Holdings Limited, Cambridge (GB)

( * ) Notice: Subject to any disclaimer, the term of this patent is extended or adjusted under 35 U.S.C. 154(b) by 113 days.

(21) Appl. No.: 16/941,874

(22) Filed: Jul. 29, 2020

(65) Prior Publication Data
US 2020/0358799 A1 Nov. 12, 2020

Related U.S. Application Data

(63) Continuation of application No. 16/278,932, filed on Feb. 19, 2019.
(Continued)

(51) Int. Cl.
*H04L 9/40* (2022.01)
*G06N 20/10* (2019.01)
(Continued)

(52) U.S. Cl.
CPC ........ *H04L 63/1441* (2013.01); *G06F 3/0486* (2013.01); *G06F 3/04842* (2013.01);
(Continued)

(58) Field of Classification Search
None
See application file for complete search history.

(56) References Cited

U.S. PATENT DOCUMENTS

| 6,154,844 A | 11/2000 | Touboul et al. |
| 6,965,968 B1 | 11/2005 | Touboul |

(Continued)

FOREIGN PATENT DOCUMENTS

| EP | 2922268 A1 | 9/2015 |
| WO | 2001031420 A2 | 5/2001 |

(Continued)

OTHER PUBLICATIONS

Gharan, Shayan Oveis, "Lecture 11: Clustering and the Spectral Partitioning Algorithm" May 2, 2016.
(Continued)

*Primary Examiner* — Michael W Chao
(74) *Attorney, Agent, or Firm* — Rutan and Tucker, LLP (57) ABSTRACT

The cyber security appliance can have at least the following components. A phishing site detector that has a segmentation module to break up an image of a page of a site under analysis into multiple segments and then analyze each segment of the image to determine visually whether a key text-like feature exists in that segment. A signature creator creates a digital signature for each segment containing a particular key text-like feature. The digital signature for that segment is indicative of a visual appearance of the particular key text-like feature. Trained AI models compare digital signatures from a set of key text-like features detected in the image of that page under analysis to digital signatures of a set of key text-like features from known bad phishing sites in order to output a likelihood of maliciousness of the unknown site under analysis.

20 Claims, 6 Drawing Sheets

Related U.S. Application Data (60) Provisional application No. 62/880,450, filed on Jul. 30, 2019, provisional application No. 62/632,623, filed on Feb. 20, 2018.

(51) Int. Cl.

| | | |
|---|---|---|
| *G06N 20/00* | (2019.01) | |
| *G06F 21/36* | (2013.01) | |
| *H04L 43/045* | (2022.01) | |
| *G06F 16/2455* | (2019.01) | |
| *G06F 3/04842* | (2022.01) | |
| *G06F 3/0486* | (2013.01) | |
| *H04L 41/22* | (2022.01) | |
| *G06F 40/40* | (2020.01) | |
| *H04L 51/42* | (2022.01) | |
| *H04L 51/212* | (2022.01) | |
| *G06F 21/55* | (2013.01) | |
| *G06F 18/23* | (2023.01) | |
| *G06F 18/232* | (2023.01) | |
| *G06N 20/20* | (2019.01) | |

(52) U.S. Cl.
CPC .......... *G06F 16/2455* (2019.01); *G06F 18/23* (2023.01); *G06F 18/232* (2023.01); *G06F 21/36* (2013.01); *G06F 21/554* (2013.01); *G06F 21/556* (2013.01); *G06F 40/40* (2020.01); *G06N 20/00* (2019.01); *G06N 20/10* (2019.01); *H04L 41/22* (2013.01); *H04L 43/045* (2013.01); *H04L 51/212* (2022.05); *H04L 51/42* (2022.05); *H04L 63/0209* (2013.01); *H04L 63/0428* (2013.01); *H04L 63/101* (2013.01); *H04L 63/14* (2013.01); *H04L 63/1416* (2013.01); *H04L 63/1425* (2013.01); *H04L 63/1433* (2013.01); *H04L 63/1483* (2013.01); *H04L 63/20* (2013.01); *G06N 20/20* (2019.01)

(56) References Cited

U.S. PATENT DOCUMENTS

| | | | |
|---|---|---|---|
| 7,307,999 B1 | 12/2007 | Donaghey | |
| 7,418,731 B2 | 8/2008 | Touboul | |
| 7,448,084 B1 | 11/2008 | Apap et al. | |
| 7,890,869 B1 | 2/2011 | Mayer et al. | |
| 8,220,047 B1* | 7/2012 | Soghoian | H04L 51/14 |
| | | | 709/227 |
| 8,306,332 B2* | 11/2012 | Obdrzalek | G06F 16/583 |
| | | | 382/209 |
| 8,312,540 B1 | 11/2012 | Kahn et al. | |
| 8,356,076 B1* | 1/2013 | Wittel | H04L 51/12 |
| | | | 726/4 |
| 8,661,538 B2 | 2/2014 | Cohen-Ganor et al. | |
| 8,806,622 B2* | 8/2014 | Waterson | H04L 63/1483 |
| | | | 726/25 |
| 8,819,803 B1 | 8/2014 | Richards et al. | |
| 8,879,803 B2 | 11/2014 | Ukil et al. | |
| 8,966,036 B1 | 2/2015 | Asgekar et al. | |
| 9,043,905 B1 | 5/2015 | Alien et al. | |
| 9,106,687 B1 | 8/2015 | Sawhney et al. | |
| 9,185,095 B1 | 11/2015 | Moritz et al. | |
| 9,213,990 B2 | 12/2015 | Adjaoute | |
| 9,348,742 B1 | 5/2016 | Brezinski | |
| 9,401,925 B1 | 7/2016 | Guo et al. | |
| 9,516,039 B1 | 12/2016 | Yen et al. | |
| 9,516,053 B1 | 12/2016 | Muddu et al. | |
| 9,641,544 B1 | 5/2017 | Treat et al. | |
| 9,712,548 B2 | 7/2017 | Shmueli et al. | |
| 9,727,723 B1 | 8/2017 | Kondaveeti et al. | |
| 10,237,298 B1 | 3/2019 | Nguyen et al. | |
| 10,268,821 B2 | 4/2019 | Stockdale | |
| 10,419,466 B2 | 9/2019 | Ferguson | |
| 10,516,693 B2 | 12/2019 | Stockdale et al. | |
| 10,701,093 B2 | 6/2020 | Dean | |
| 10,834,128 B1* | 11/2020 | Rajagopalan | G06N 3/08 |
| 10,997,463 B2* | 5/2021 | Wang | G06V 10/764 |
| 11,301,560 B2* | 4/2022 | Prakash | G06F 21/552 |
| 11,388,193 B2* | 7/2022 | Damian | H04L 63/0236 |
| 2002/0174217 A1 | 11/2002 | Anderson et al. | |
| 2002/0186698 A1 | 12/2002 | Ceniza | |
| 2003/0070003 A1 | 4/2003 | Chong et al. | |
| 2004/0083129 A1 | 4/2004 | Herz | |
| 2004/0167893 A1 | 8/2004 | Matsunaga et al. | |
| 2005/0065754 A1 | 3/2005 | Schaf et al. | |
| 2007/0118909 A1 | 5/2007 | Hertzog et al. | |
| 2007/0294187 A1 | 12/2007 | Scherrer | |
| 2008/0002893 A1* | 1/2008 | Vincent | G06V 20/63 |
| | | | 382/229 |
| 2008/0002916 A1* | 1/2008 | Vincent | G06T 7/33 |
| | | | 382/229 |
| 2008/0005137 A1 | 1/2008 | Surendran et al. | |
| 2008/0077358 A1 | 3/2008 | Marvasti | |
| 2008/0109730 A1 | 5/2008 | Coffman et al. | |
| 2009/0106174 A1 | 4/2009 | Battisha et al. | |
| 2009/0220166 A1* | 9/2009 | Choi | G06V 30/162 |
| | | | 382/260 |
| 2009/0254971 A1 | 10/2009 | Herz et al. | |
| 2010/0009357 A1 | 1/2010 | Nevins et al. | |
| 2010/0095374 A1 | 4/2010 | Gillum et al. | |
| 2010/0107254 A1 | 4/2010 | Eiland et al. | |
| 2010/0125908 A1 | 5/2010 | Kudo | |
| 2010/0235908 A1 | 9/2010 | Eynon et al. | |
| 2010/0239163 A1* | 9/2010 | Oh | G06F 18/22 |
| | | | 382/218 |
| 2010/0299292 A1 | 11/2010 | Collazo | |
| 2011/0093428 A1 | 4/2011 | Wisse | |
| 2011/0213742 A1 | 9/2011 | Lemmond et al. | |
| 2011/0261710 A1 | 10/2011 | Chen et al. | |
| 2012/0096549 A1 | 4/2012 | Amini et al. | |
| 2012/0137367 A1 | 5/2012 | Dupont et al. | |
| 2012/0209575 A1 | 8/2012 | Barbat et al. | |
| 2012/0210388 A1 | 8/2012 | Kolishchak | |
| 2012/0284791 A1 | 11/2012 | Miller et al. | |
| 2012/0304288 A1 | 11/2012 | Wright et al. | |
| 2013/0091539 A1 | 4/2013 | Khurana et al. | |
| 2013/0198119 A1 | 8/2013 | Eberhardt, III et al. | |
| 2013/0198840 A1 | 8/2013 | Drissi et al. | |
| 2013/0254885 A1 | 9/2013 | Devost | |
| 2014/0007237 A1 | 1/2014 | Wright et al. | |
| 2014/0074762 A1 | 3/2014 | Campbell | |
| 2014/0165207 A1 | 6/2014 | Engel et al. | |
| 2014/0215618 A1 | 7/2014 | Amit | |
| 2014/0325643 A1 | 10/2014 | Bart et al. | |
| 2015/0033340 A1 | 1/2015 | Giokas | |
| 2015/0067835 A1 | 3/2015 | Chari et al. | |
| 2015/0081431 A1 | 3/2015 | Akahoshi et al. | |
| 2015/0161394 A1 | 6/2015 | Ferragut et al. | |
| 2015/0163121 A1 | 6/2015 | Mahaffey et al. | |
| 2015/0172300 A1 | 6/2015 | Cochenour | |
| 2015/0180893 A1 | 6/2015 | Im et al. | |
| 2015/0213358 A1 | 7/2015 | Shelton et al. | |
| 2015/0286819 A1 | 10/2015 | Coden et al. | |
| 2015/0310195 A1 | 10/2015 | Bailor et al. | |
| 2015/0319185 A1 | 11/2015 | Kirti et al. | |
| 2015/0341379 A1 | 11/2015 | Lefebvre et al. | |
| 2015/0363699 A1 | 12/2015 | Nikovski | |
| 2015/0379110 A1 | 12/2015 | Marvasti et al. | |
| 2016/0062950 A1 | 3/2016 | Brodersen et al. | |
| 2016/0078365 A1 | 3/2016 | Baumard | |
| 2016/0149941 A1 | 5/2016 | Thakur et al. | |
| 2016/0164902 A1 | 6/2016 | Moore | |
| 2016/0173509 A1 | 6/2016 | Ray et al. | |
| 2016/0241576 A1 | 8/2016 | Rathod et al. | |
| 2016/0337401 A1* | 11/2016 | Bendersky | H04L 63/0254 |
| 2016/0352768 A1 | 12/2016 | Lefebvre et al. | |
| 2016/0359695 A1 | 12/2016 | Yadav et al. | |
| 2016/0373476 A1 | 12/2016 | Dell'Anno et al. | |
| 2017/0054745 A1 | 2/2017 | Zhang et al. | |
| 2017/0063907 A1 | 3/2017 | Muddu et al. | |
| 2017/0063910 A1 | 3/2017 | Muddu et al. | |

(56) References Cited

U.S. PATENT DOCUMENTS

| | | | |
|---|---|---|---|
| 2017/0063911 A1 | 3/2017 | Muddu et al. | |
| 2017/0169360 A1 | 6/2017 | Veeramachaneni et al. | |
| 2017/0270422 A1 | 9/2017 | Sorakado | |
| 2018/0027006 A1 | 1/2018 | Zimmermann et al. | |
| 2018/0167402 A1 | 6/2018 | Scheidler et al. | |
| 2018/0300855 A1* | 10/2018 | Tang | G06T 3/4053 |
| 2019/0019020 A1* | 1/2019 | Flament | G06V 30/40 |
| 2019/0036948 A1 | 1/2019 | Appel et al. | |
| 2019/0044963 A1 | 2/2019 | Rajasekharan et al. | |
| 2019/0114743 A1* | 4/2019 | Lund | G06N 3/08 |
| 2019/0334947 A1* | 10/2019 | Govardhan | H04L 63/1425 |
| 2020/0067861 A1* | 2/2020 | Leddy | G06Q 30/0185 |
| 2020/0244673 A1 | 7/2020 | Stockdale | |
| 2020/0280575 A1 | 9/2020 | Dean et al. | |
| 2021/0120027 A1 | 4/2021 | Dean et al. | |
| 2021/0157919 A1 | 5/2021 | Stockdale et al. | |
| 2021/0273958 A1 | 9/2021 | McLean | |
| 2022/0150279 A1* | 5/2022 | Prakash | H04L 63/1483 |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |
| WO | WO-2020183267 A1 * | 9/2020 ........... G06F 16/532 |

OTHER PUBLICATIONS

Nikolystylfw, "Can Senseon beat Darktrace at its very own game with its 'An I triangulation' modern technology?" Dec. 22, 2018, nikolystylfw.

Lunden, Ingrid, "Senseon raises $6.4M to tackle cybersecurity threats with an AI 'triangulation' approach" Feb. 19, 2019, Tech Crunch.

Senseon Tech Ltd., "The State of Cyber Security SME Report 2019," Jun. 3, 2019.

Senseon Tech Ltd., "Technology,".

Senseon Tech Ltd., "Senseon & You,".

Senseon Tech Ltd., "Technology Overview,".

Senseon Tech Ltd., "Senseon Enterprise,".

Senseon Tech Ltd., "Senseon Pro,".

Senseon Tech Ltd., "Senseon Reflex,".

Abdallah Abbey Sebyala et al., "Active Platform Security through Intrusion Detection Using Naive Bayesian Network ror Anomaly Detection," Department of Electronic and Electrical Engineering, 5 pages, University College London, Torrington Place, England, United Kingdom.

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.

* cited by examiner

MALICIOUS SITE DETECTION FOR A CYBER THREAT RESPONSE SYSTEM

RELATED APPLICATION

This application claims priority to and the benefit of under 35 USC 119 of U.S. provisional patent application titled "A cyber security system with enhancements," filed Jul. 30, 2019, Ser. No. 62/880,450, which is incorporated herein by reference in its entirety. In addition, this application claims priority to and the benefit of under 35 USC 120 as a continuation in part of U.S. Non-Provisional patent application Ser. No. 16/278,932, titled "A cyber threat defense system protecting email networks with machine learning models," filed: Feb. 19, 2019, which claims priority under 35 USC 119 to U.S. provisional patent application titled "A cyber defense system with various improvements," filed Feb. 20, 2018, Ser. No. 62/632,623. All of the above are incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

BACKGROUND

Phishing websites are very transient; they are often hosted on hacked business/personal websites or URLs generated at random and hosted on cloud platforms which persist for only a short time. For this reason, keeping a list of 'known bad' sites is ineffective.

Many malicious websites can be close replicas of the legitimate site's page so a direct visual comparison alone can be ineffective. A pure OCR (Optical Character Recognition) approach can also be ineffective.

In contrast, the phishing site detector is not reliant on one 'pure' methodology to identify phishing websites so it does not fall into these traps.

SUMMARY

In an embodiment, a cyber security appliance protects a system, including but not limited to a network, from cyber threats. The cyber security appliance can have at least the following components.

A phishing site detector that has a segmentation module to break up an image of a page of a site under analysis into multiple segments and then analyze each segment of the image of that page to determine visually whether a key text-like feature exists in that segment. A signature creator creates a digital signature for each segment containing a particular key text-like feature. The digital signature for that segment containing the particular key text-like feature at least is indicative of a visual appearance of the particular key text-like feature. One or more trained AI models trained to compare digital signatures from a set of key text-like features detected in the image of that page of the unknown site under analysis to digital signatures of a set of key text-like features from a plurality of known bad phishing sites in order to output at least a likelihood of maliciousness of the unknown site under analysis. Note, any portions of the cyber security appliance implemented as software can be stored in one or more non-transitory memory storage devices in an executable format to be executed by one or more processors.

These and other features of the design provided herein can be better understood with reference to the drawings, description, and claims, all of which form the disclosure of this patent application.

DRAWINGS

The drawings refer to some embodiments of the design provided herein in which.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DETAILED DISCUSSION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

Overall, the phishing site detector in the cyber security appliance uses machine learning approaches 1) to detect segments of text-like features in a screenshot of a page under analysis in order 2) to create a digital signature for the text-like features, 3) to transform each segment of the screen shot into a comparable rendered size of the similar feature represented in the library of digital signatures, 4) to classify these text-like features in the segments into likely subject matter categories (keywords like 'email' or brand names such as 'Google'), and 5) to compare the existing library of feature digital signatures with those derived for newly created segments of a page with a corresponding text-like feature from a site the phishing site detector puts under analysis.

Figure 1:
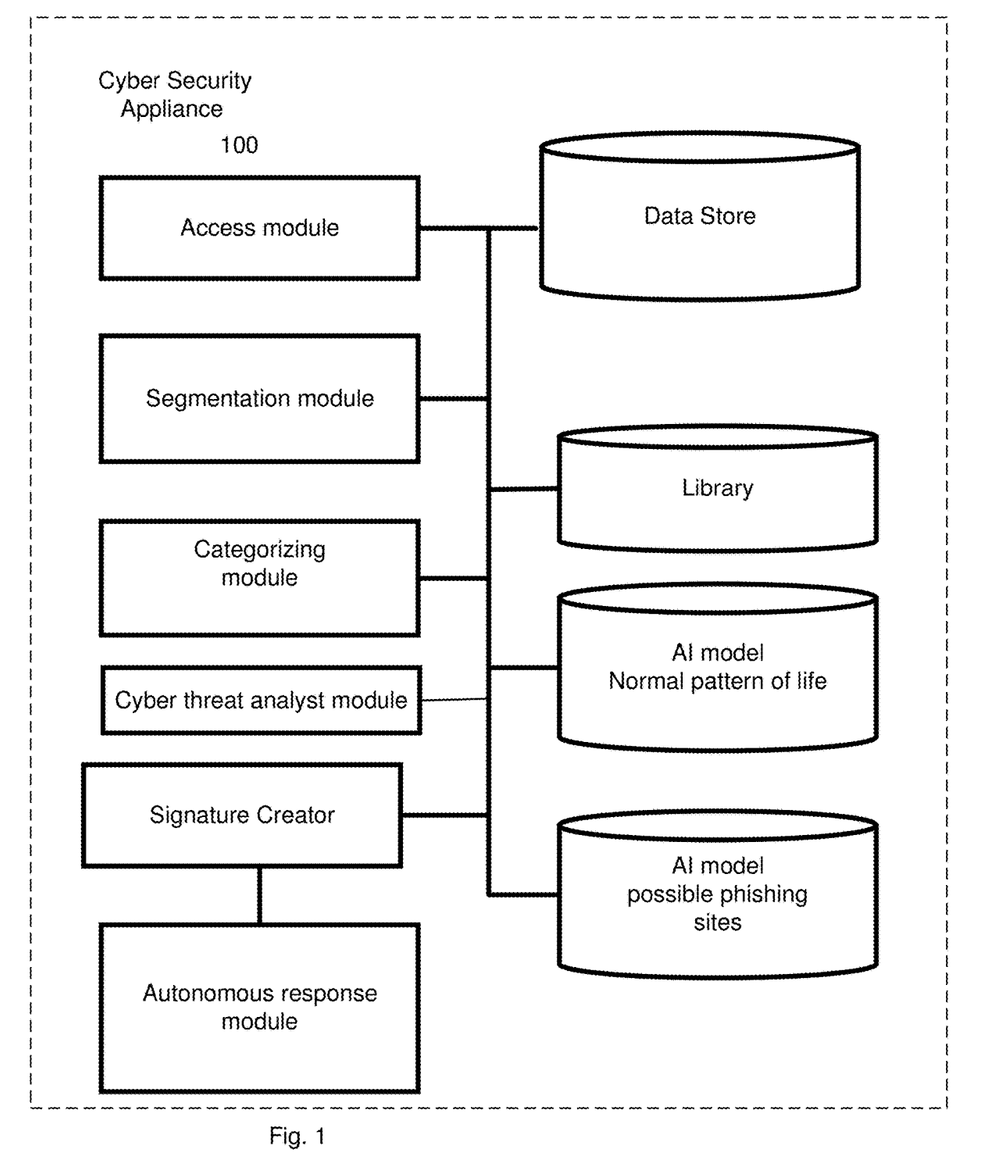
FIG. 1 illustrates a block diagram of an embodiment of a phishing site detector and its modules to protect a system, such as an email system, from phishing threats.

FIG. 1 illustrates a block diagram of an embodiment of a phishing site detector and its modules to protect a system, such as an email system, from phishing threats.

Figure 2:
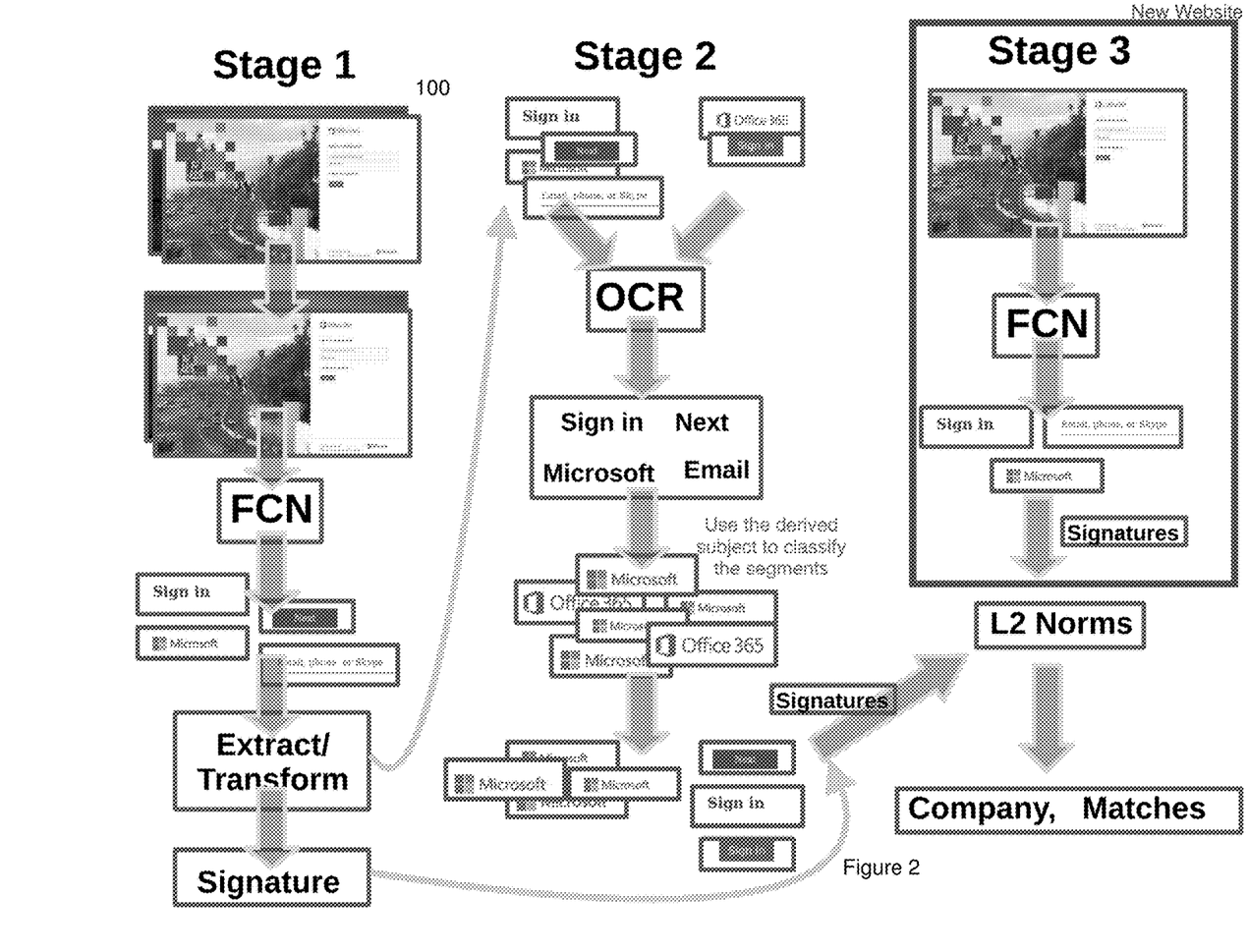
FIG. 2 illustrates a flow diagram of an embodiment of the phishing site detector.

The phishing site detector 100 can identify an unknown site, such as a website, attempting to steal credentials from a victim by performing the operations in stages 1-3. FIG. 2 illustrates a flow diagram of an embodiment of the phishing site detector.

Referring to FIGS. 1 and 2, in stage 3 in operation when deployed to protect a system, the phishing site detector 100 rapidly compares key text-like features detected in an unknown site under analysis, potentially associated with a link in an email, to the trained AI model(s) on at least characteristics of known bad phishing websites and its associated library in order to output a likelihood of maliciousness of the site under analysis; and optionally, the likely site it is attempting to impersonate.

In stage 3, the phishing site detector 100 performs many of the same operations on a new site under analysis that occur in steps 1 and 2 on the pages from known good and/or bad sites. In an implementation embodiment of the phishing site detector 100 during deployment (e.g. in stage 3), the machine learning method can be applied to determine and identify whether the site under analysis, such as site accessed via an email-based link is a phishing link.

An access module captures one or more screen shots/scans of a page of a site under analysis to create one or more images of that page. The access module can when an email under analysis is checked, then the access module is configured to access a link in the email to capture the image of at least a log-in page (including a financial transaction page) associated with the unknown site accessed through the link. The access module can capture one or more screen shots to create one or more images of one or more pages, and then feeds the screenshots to the segmentation module.

A segmentation module breaks up an image of a page of a site under analysis into multiple segments of the image of the page of the unknown site under analysis. The page of the unknown site under analysis can be a log-in page for the unknown site. The segmentation module can use a machine learning algorithm for breaking up and segmenting the image of the site under analysis. The segmentation module can analyze each segment of the image of that page to determine visually whether a key text-like feature exists in that segment. The segmentation module both detects a set of key text-like features in the multiple segments of the image and determines coordinates around each key text-like feature in that set of key text-like features.

Figure 6:
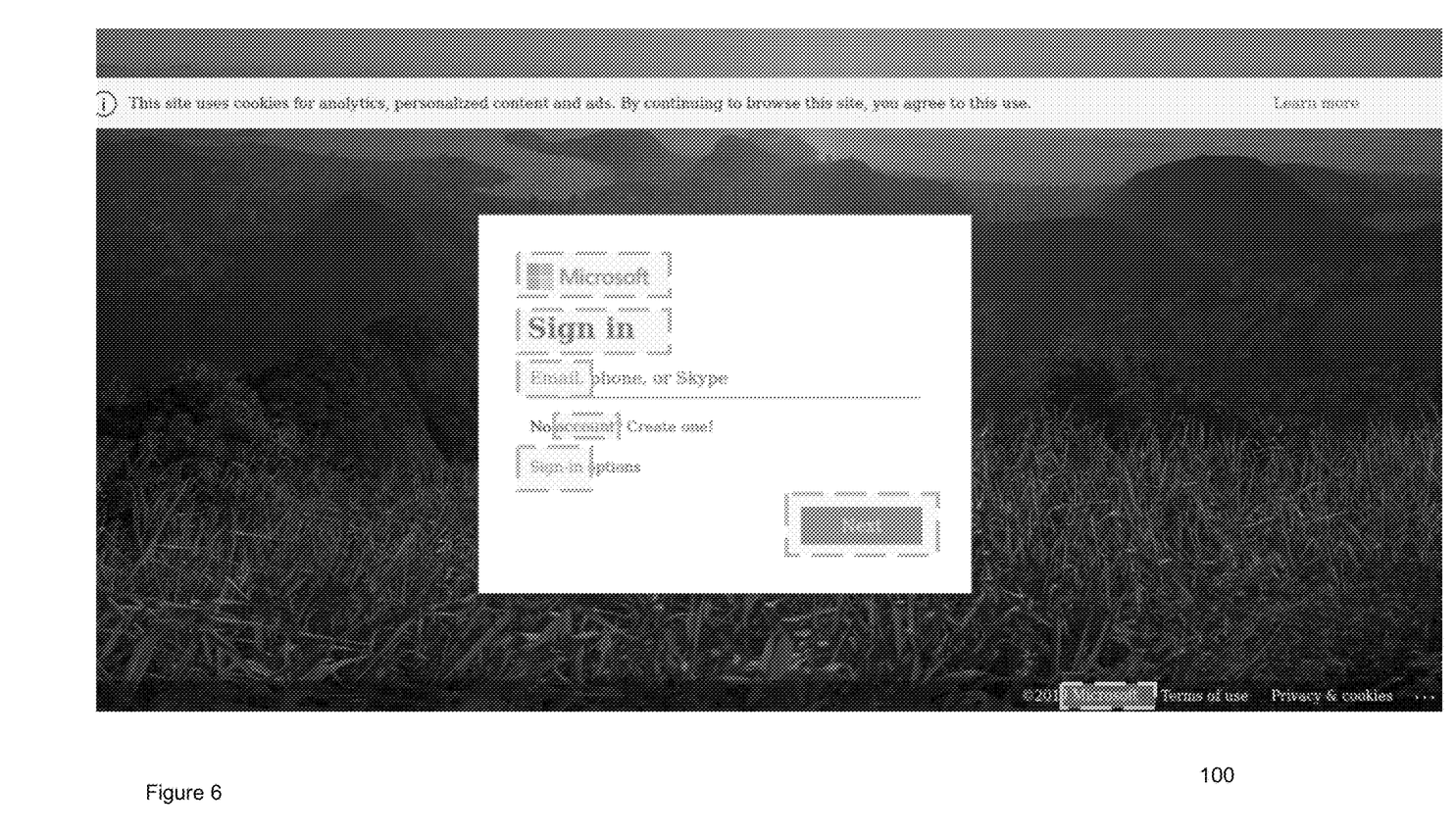
FIG. 6 illustrates a diagram of an embodiment of key features surrounded by bounding boxes.

The machine learning algorithm can be implemented in Fully Convolutional Neural Networks that is configured to analyze the image to look for specific key features that appear be text-like, including any of actual text and logos, on the image of the page under analysis. The machine learning algorithm looks on the image under analysis for specific key features that appear be text-like by detecting for, for example, gradients in color change in one or more areas and a ratio to a background color to establish a beginning and an end of each specific key feature that appears be text-like. These key text-like features will then have a bounding box formed around the coordinates of the four corners of each key text-like feature. Each key text-like feature has its own bounding box formed around the coordinates of the four corners of that text-like feature (see FIG. 6). FIG. 6 illustrates a diagram of an embodiment of the phishing site detector 100 analyzing key features surrounded by bounding boxes.

Generally, the page under analysis has a key text-like feature such as a log-in/sign in text with a field and/or link, account number text with a field and/or link, user name text with a field and/or link, a password text with a field and/or link, a shopping cart logo, register text with a field and/or link, email with a field and/or link, phone with a field and/or link, credit card field and/or link, PayPal field and/or link, order text or link, and then other key text-like features such as a company logo, other company or service identifying markings so the site being imitated by a potential phishing site is identifiable, and other text-like features such as a next button/submit button to indicate the website expects the user to input some data. Some example key text-like features have been given above to convey the type of key text-like features in the set being looked for and subsequently analyzed. In an example embodiment, either the access module or the segmentation module can look for specific key text-like features that are generally found on a page attempting to prompt the user to give over their account and/or financial information rather than any text of every page. This helps filter down an amount of page processing the phishing site detector 100 needs to process across all users being protected by the phishing site detector 100 as well as allows for improving the accuracy of detecting for the set of text-like features that will be analyzed. The phishing site detector 100 can have multiple AI models trained separately for each different service site type: e-mail service, social media service, online financial and/or payment systems, online shopping systems, and other service providers, etc.

Note, one or more of the text-like features for a phishing site generally will be different compared to the known good image(s) of the legitimate log-in page for that service.

Figure 3:
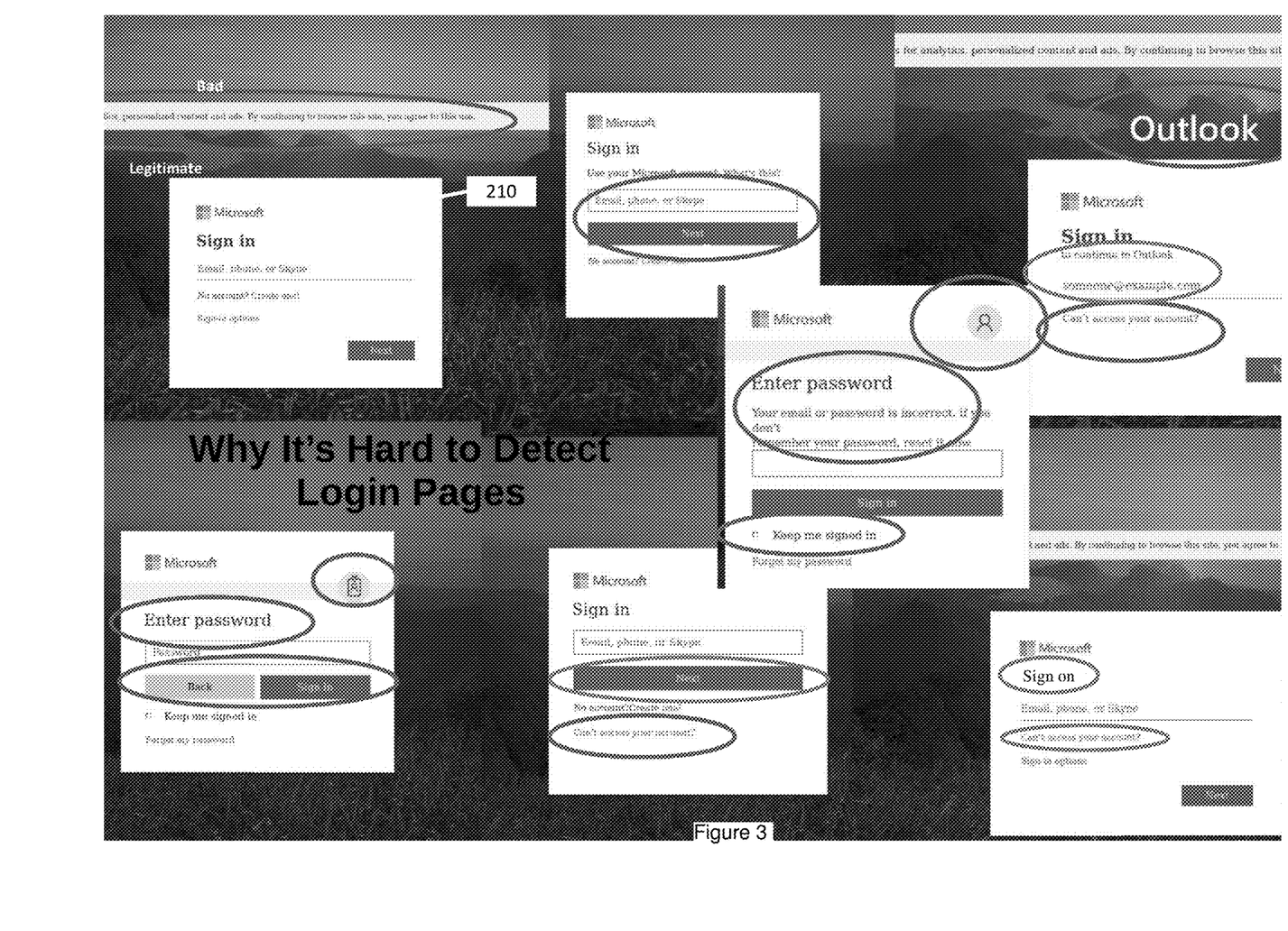
FIG. 3 illustrates a diagram of an embodiment of a segmentation module analyzing key text-like features of an example legitimate site and multiple example legitimate sites.

FIG. 3 illustrates a diagram of an embodiment of a segmentation module analyzing key text-like features of an example legitimate site 210 and multiple example phishing sites. The text-like features for a phishing website, can have the positioning of one or more of the text-like features to be visually different compared to the text-like feature on the legitimate page for that site, some text-like features may be completely missing on that page under analysis compared to the text-like feature on the legitimate page for that site, some text-like features may be i) misspelled or ii) use a different word but a similar meaning compared to the text-like feature on the legitimate page for that site, some text-like features may have different font types or sizes, different colors, and/or different style logos may differ, etc., some text-like features may have URL with a domain that does not coincide with the site it is trying to imitate, etc. All of these different aspects can be examined to determine whether in the aggregate this set of text-like features on the page under analysis is determined to likely be either a legitimate log-in page 210 or a log-in page for phishing website. Note, even the legitimate log-in page 210 for that service can have some small variance depending the type of device (i.e. mobile computing device, desktop computing device) the minimum font size and type usable by the browser, and the display screen dimensions. However, the legitimate site 210 will generally have all of the text-like features, such as words, URLs in a correct domain for that service, and logos, correctly spelled, present on the page, visually looking somewhat similar in font, color, etc. to the example known good legitimate versions of that page, and in some instances in a similar position located on that page. The legitimate site 210 will usually have the entire set of these key features, such as logos, one or more sets of text and its associated field to the example log-in page(s) for a user to that site, etc. and not be missing a key feature from the legitimate log-in page for that service.

Referring to FIGS. 1 and 2, the machine learning algorithm in the segmentation module efficiently approaches the problem in the way that a human does—what does the page 'look like', and does the page have a key text-like feature which indicates the site wants a user to 'sign in'; rather than, merely doing a direct visual comparison with a known website for all sites or a simple OCR of all of the text on that page.

The segmentation module applying the machine learning algorithm identifies areas of key features along with their coordinates on the image of the page, (e.g. in the visual appearance of the site) as rendered on the end user's computing device. The segmentation module forms a bounding box around each of these key features. The phishing site detector 100 uses the literal visual representation of the key feature, such as a word/phrase, to detect it, so it is not 'trickable' in the same way that pure OCR is. Words, phrases, logos, etc. come in different fonts, colors, and styles of text as well as misspelled word can be used in a phishing site that visually with a quick glance appear to an actual word that the user would be expecting to see, such as 'sign 1 n' with a one. OCR merely ascertains letters themselves and nothing about the visual appearance of the letters.

The segmentation module can transform the segments to standardize comparisons. On the visual image of the key feature from the website under analysis, the segmentation module uses an algorithm in order to transform and extract each key feature segment into a comparable digital signature for that segment.

A signature creator can create a digital signature for each segment containing a particular key text-like feature. The digital signature for each segment containing a key text-like feature is at least indicative of a visual appearance of the particular key text-like feature in that segment. In an embodiment, a library can store visual appearance of examples of particular key text-like features in a textual signature format.

A categorizing module can use a blended approach to analyze at least each segment in the image determined to have a key text-like feature via i) OCR text recognition as well as with ii) analysis of a literal visual representation from the image of that page under analysis to determine what does each key text-like feature on the page visually look like, and then iii) use both of resulting text from the OCR text recognition and the visual appearance of the key text-like feature in order to determine a category that this key text-like feature in this segment of the image of the page under analysis belongs to. The categorizing module can perform OCR text analysis on each key text-like feature in the set of key text-like features and an analysis of a literal visual representation on each key text-like feature, in combination, to determine what meaning that key text-like feature is trying to convey in order to help catalog that key text-like feature for a comparison where OCR is not able to derive a clear categorization for a segment, a visual comparison can be made (via the derived signatures) to compare with images which are successfully categorized via OCR. Therefore, the system is robust to misspellings or confusable characters in one segment by performing a purely visual comparison with those successfully derived, The categorizing module and its algorithm compares key features in the same category in the existing library of digital signatures to the digital signature for key text-like features within the segments from the site under analysis.

Note, the phishing site detector 100 does not OCR initially to look for 'keywords' in the image but rather relies on a visual analysis in the segmentation module. Rather, the phishing site detector 100 in the categorizing module uses the OCR text recognition to classify the different segments by their purpose, and it doesn't need to be fed this data labelled by an operator, although, optionally, it can be fed this data.

One or more trained AI models are trained to compare the digital signatures from a set of key text-like features detected in the image of that page of an unknown site under analysis, in real time, to the digital signatures of another set of key text-like features from ten or more known bad phishing sites in order to output a likelihood of maliciousness of the unknown site under analysis. Generally, the library of digital signatures of each key text-like feature from known phishing sites referenced by the AI model will have, for example, 30 to 100 examples of each key text-like feature from each different types of services as well as most of the most widely used/popular services.

Each trained AI model is trained to compare i) one or more key text-like features from the set of key text-like features detected in the image under analysis in a particular category of features to ii) digital signatures also in the same category for key text-like features from the set of key text-like features from the known bad phishing sites stored in the library of digital signatures. The trained AI model compares the digital signatures from the set of key text-like features detected in the unknown site to the digital signatures of key text-like features of known bad phishing sites in that same category, in order to output the likelihood of maliciousness of the unknown site under analysis.

The phishing site detector 100 can make a rapid decision by comparing signatures of key text-like feature as opposed to longer time consuming tasks such as needing to obtain specific site characteristics (such as whether the page is a new site, who is registrant for that site, etc.). Also the phishing site detector 100 need not detect and compare everything on every page which would consume a lot of processing power and time. The digital signatures of each key feature can be quickly compared to a previously unknown/new website associated with site, such as accessible via a link, undergoing analysis to determine a score of how close 'each key feature in the scanned image of the log-in page of the new website under analysis' is too the current legitimate key feature and/or how close is that 'each key feature in the scanned image of the log-in page of the new website under analysis' is too a key feature found in a known bad website. The phishing site detector 100 is quick. Cumbersome methods may cause the end user to look for ways to circumvent the system to avoid waiting.

In an embodiment the trained AI model may compare the digital signature under analysis to the library of known digital signatures from known phishing sites, via a L2 norms calculation in order to output a likelihood that the site is a malicious impersonation of some given login/access page and the likely site or service the page under analysis is attempting to impersonate. Note, a L2 Norm can be the L2 norm of a vector and be calculated as the Euclidean distance value from the origin.

Note the machine learning algorithm can use a L2-norm for regularization but also could use the L1-norm for regularization via using absolute deviations (LAD).

The L2-norm can basically minimize the sum of the square of the differences (S) between the target value ($Y_i$) and the estimated values ($f(x_i)$):

$$S = \sum_{i=1}^{n} (y_i - f(x_i))^2$$

The L2-norm can be very computationally efficient compared to determining a L1-norm. Also, the AI model will see a much larger error in digital signatures of key features from the bad phishing websites features compared to the features of known good website features since a L2-norm squares the error (increasing by a lot if error>1), (e.g. e vs $e^2$) than the L1-norm, so the AI model is much more sensitive to detecting this error.

The AI model results can be communicated to an autonomous response module. The autonomous response module that is pre-configured to upon a determination that enough key text-like features from the set of key text-like features from the unknown site under analysis closely match digital signatures in the other set of key text-like features from known bad phishing sites to take an action. For example, the autonomous response module can lock out a user's ability to access the unknown site under analysis and generate a notice to the user that the unknown site is likely a malicious phishing site. If it is an email, then the autonomous response module will disable and/or remove the link from the email.

The close enough match can weight in multiple parameters such as missing key text-like features, the URL having a different domain than the site is attempting to imitate, amount of key text-like features closely measuring to the examples from known phishing sites, how far the key text-like features measure from the examples from a legitimate site if the system has examples from this legitimate site, and many other examples discussed herein.

The phishing site detector 100 with its modules and AI models derives key features from a given screenshot of a page under analysis and compares those key features to key features in the same category from the library of logos, texts and/or phrases from known phishing sites, and outputs if there is a calculated substantial close match—indicating a spoofed, for example, Office 365 page etc.

Next, in stages 1-2, training of the AI models occurs to detect features and characteristics of at least known phishing websites as well as to create a library of digital signatures corresponding to these text-like features and characteristics of known phishing websites so that in stage 3 when the phishing site detector 100 is deployed, then a rapid comparison can be made to a page under analysis. Stage 3 uses a lot of these same processes. In stages 1-2, training of the AI models occurs on example key text-like features of a known log-in page of lots of known phishing site examples and optionally legitimate key text-like features of a log-in page for that service site, such as an e-mail service, social media service or other service provider.

Both in deployment in stage 3 and in the training in stages 1 and 2, the phishing site detector 100 uses similar mechanics of 1) grabbing a screen shot of a known good or bad log-in page for an example service under analysis, 2) determining key text-like features on that log-in page, and then what are the coordinates of those key text-like features via segmentation of the image, 3) creating a bounding box around the key text-like feature using the coordinates, 4) creating a digital signature for that text-like feature, and 5) determining a category for that text-like feature, and 6) either i) creating a library of digital signatures for text-like features from at least a plurality, such as 30-100 known phishing websites during training in stages 1 and 2, or ii) comparing digital signatures of text-like features for a page under analysis to the library of digital signatures of text-like features to assess a likelihood of maliciousness of the page under analysis in stage 3. The page under analysis can be, for example, the log-in page for that service site.

In stage 1 during the training, the phishing site detector 100 grabs an image (screen shot and/or scan) of a page under analysis. The AI models of the phishing site detector 100 are initially trained on a set of known bad websites and optionally good websites (including other service site types) with historic login pages for services such as Microsoft, Netflix, Dropbox, etc. Next, the phishing site detector 100 applies a visual analysis on image scans/image screenshots of log-in pages for a given e-mail service, social media service, or other service provider. The phishing site detector 100 trains the AI models separately for each different service type— (e.g. e-mail service, social media service, or other service provider). Each image scan of a bad site is analyzed, including some pre-processing analysis can be applied to the log-in page for each image scan to attempt to normalize each of the screenshots from the set of bad website characteristics amongst each other. This eliminates any massive deviations of each log-in page due to scaling due to the display screen dimensions, completeness of the screen grab, or other factors depending on the device and display that particular website is being rendered onto. Next, the segmentation module can break up an image (screen shot) of a page under analysis into multiple segments and then analyze each segment of a screen shot of that page to determine key text-like features in that segment. The phishing site detector 100 can apply Fully Convolutional Neural Networks for segmentation to an example scanned image from a known malicious/phishing site to detect segments of key text-like features in the scanned image. The Fully Convolutional Neural Network analyzes segments of the screen shot to find each segment that visually has a text-like feature, including actual text and logos, without doing an OCR to determine what the text-like feature is attempting to convey by its text. Instead, the FCN looks for segments with text-like features that have a lot of variance in color, including grey scaling variants, to the background color of the page to find key text-like features. The FCN looks for key text-like features in the segments containing text-like images. The FCN looks for background color of the page to determine where the key text-like feature begins and ends. For example, the key text-like features could be i) a sign-in field, ii) a password field, and then other text-like features can include iii) instructions, iv) logos, and v) other text-like features. The segmentation module identifies each area with a text-like feature along with their coordinates on the scanned image in the visual appearance of the site as rendered to the end user's device and display screen. The Artificial Intelligence image classification uses Fully Convolutional Neural Networks for Segmentation of the scanned image. The algorithm extracts free-form regions from an image of the page that look like text, including a phrase, a logo, URL, etc. and coordinates of the text-like feature to create a bounding box around that text-like feature. Later after OCR, the phishing site detector 100 can then place that text-like image into a category of text-like feature, such as instructions, phrase, logo, etc.

The bounding box is formed around the coordinates of each key feature under analysis found by the FCN. Each bounding box containing its key feature is enlarged to capture some additional white area in the image around the key feature.

The phishing site detector 100 uses an algorithm to transform each segment into a comparable size dimensions for that segment under analysis to the digital signatures of examples of known legitimate and known bad features from past phishing sites. Each key feature and its additional area around that key feature in the image is transformed into a fixed rendered size to be comparable to the library of digital signatures for known examples of good and/or bad features. Each segment is also converted to greyscale (shades of black and white) to control for color variances.

The phishing site detector 100 now does two actions in parallel. 1) The phishing site detector 100 creates a digital signature to complete stage 1 of the analysis for each key text like features. 2) Also, the phishing site detector 100 sends the bounded box for that text-like feature to have its meaning determined in order to classify that feature in stage 2.

In the final step of stage 1, the phishing site detector 100 creates digital signatures for each of the segments with text-like features. The digital signature essentially captures visually what each of the text-like features look like; and optionally, positionally where this feature is found on the log-in page. The digital signature can include things like the areas which have a least variance, and cuts in towards the most important parts of the key features captured in that segment to capture gradients of various points within that segment. The gradients can vary in color including gray scale shade changes. Note, this also minimizes differences in a digital signature resulting from different font sizes and amount of white space captured in the bounded box of that key feature. A long binary string becomes the digital signature for that key feature segment.

The phishing site detector 100 during training creates or at least adds to a library of digital signatures from the segments from known bad phishing sites. The phishing site detector 100 applies the above steps for all of the samples from the known bad websites. Thus, each bad website will have multiple digital signatures, one for each of the key features determined on the log-in page for that website.

The phishing site detector 100 is initially trained on a set of known bad websites and optionally known good websites with historic login pages for services such as Microsoft, Netflix, Dropbox, etc.

The phishing site detector 100 can also apply the above steps, on a regular periodic basis for the current legitimate log-in page for that e-mail service, social media service, or other service provider, and add those samples to the library. This way the AI model update how close a given text-like feature is compared to both the known text-like feature from the legitimate site and/or the known text-like feature(s) from known phishing sites.

The phishing site detector 100 blends the following three methods into use. The phishing site detector 100 factors a combination of i) segment detection in the image under analysis, ii) the literal visual representation of the key feature reflected in a digital signature, and iii) OCR text recognition along with visual analysis of a key text like feature to avoid the same pitfalls as pure text recognition.

The phishing site detector 100 can create or at least adds to a library of known good segments from legitimate log-in pages and the known bad segments of log-in pages from phishing sites.

The phishing site detector 100 is initially trained on a set of known bad websites and optionally known good websites with historic login pages for services such as Microsoft, Netflix, Dropbox, etc.; but, is self-refining and self-training in approach as any new sites detected with a high confidence of being bad are fed back into the training set as example bad sites for common traits used in bad phishing sites, as well as when a new login page appears on the internet for services such as Microsoft, Netflix, Dropbox, etc. then that example good web site is also fed back into the training set for the AI model.

Figure 5:
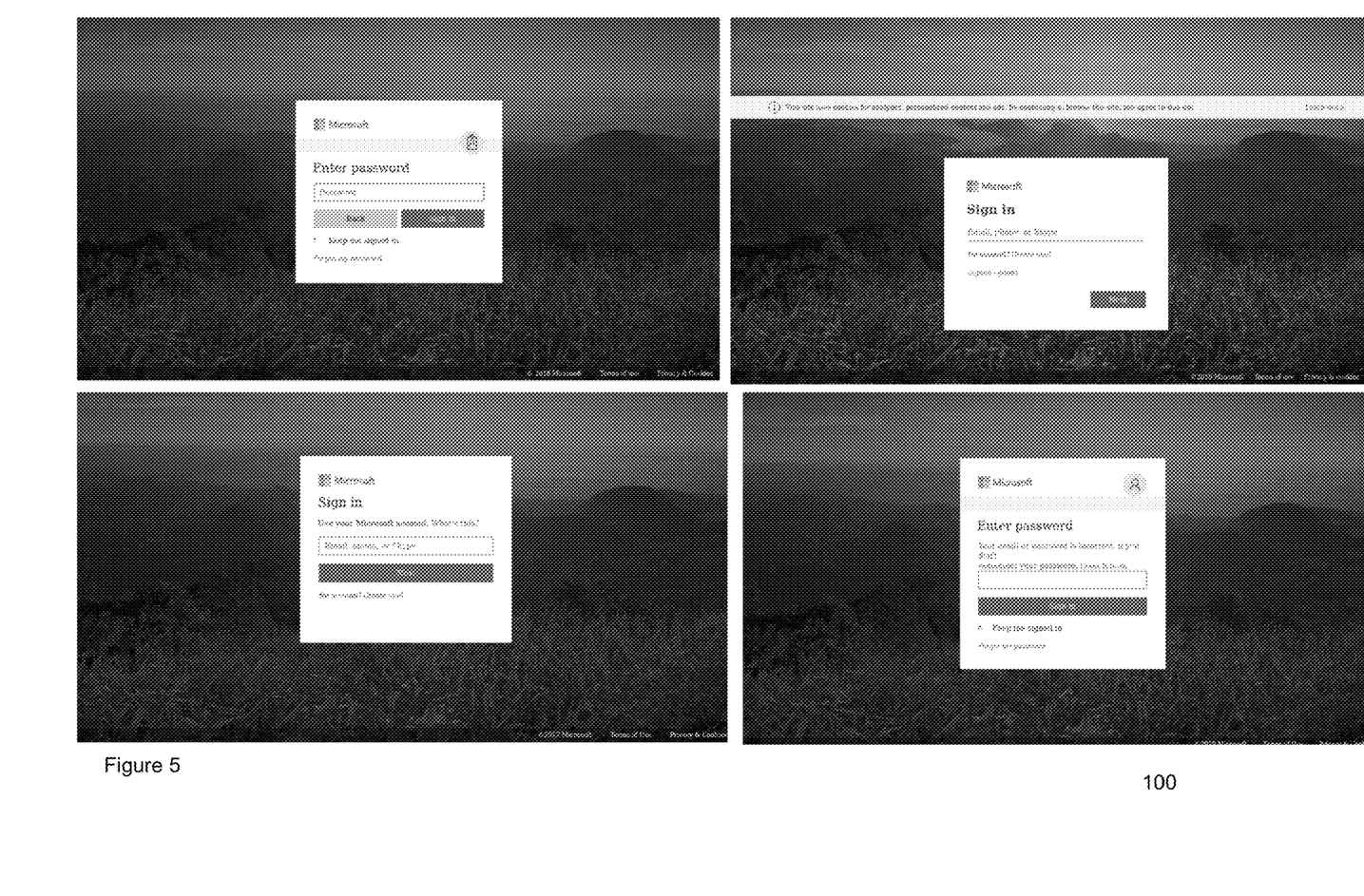
FIG. 5 illustrates a diagram of an embodiment of examples of fake login pages.

As discussed, during the deployment of the phishing site detector 100, the training of the phishing site detector 100 is self-learning and unsupervised—when a new 'bad' site is detected, it is used as new learning data and so it can refine itself without human intervention. Also, when a new verified good log-in page for service site such as Microsoft, Netflix, Dropbox etc. comes online, then that example is also fed back into the training set for the AI model. The phishing site detector 100 can store and update the URLs and sequences for most of the major services sites to verify that the image under analysis is a verified good login page. FIG. 5 illustrates a diagram of an embodiment of the phishing site detector 100 analyzing examples of fake login pages. The image of the page of the unknown site under analysis can be a bad page that harvests log-in credentials for the unknown site. Often the phishing page that harvests log-in credentials are not really login pages as they don't go anywhere—it's a flat form with fields that harvest credentials. So, the phishing page that harvests log-in credentials can look like a log-in page but it's a façade.

In stage 2, another portion of the training process occurs. Again, stage 3 reuses many of these processes during deployment. The categorizing module performs OCR text analysis on the key text-like feature in combination with a visual analysis to determine what meaning the key features are trying to convey/say in order to help catalog for a later comparison. Each key feature in its bounding box is submitted for OCR analysis and visual analysis of what does that text like feature look like. For example, 'sign 1 n' with a 1 instead of a second T visually looks like the key feature of sign in on a log-in page even if the OCR of the text-like feature (simply by itself) would not be interpreted normally by a computer to be the key feature wanting the user to supply their sign in credentials in that field. However, as the module compares the signature of the visual segment to the signature of other segments, it can identify similar segments which have been successfully recognized and categorized via OCR. Therefore, the example 'sign 1n' would still be categorized with 'sign in' segments due to visual similarity.

In the image, the categorizing module uses the text recognition and visual analysis to categorize key text-like features in the different segments of the screen shot of the page by their intended purpose. The blended approach using text recognition for classification of that text-like feature but not as a sole factor for actual detection is a novel and highly useful twist on the current detection methodology.

Each of the text-like features of will be placed into its own category. For example, 1) the appearance and text of each of the text-like features of logos from the bad sites can be grouped together, 2) the appearance and text of the text-like features of each 'sign on/sign in' text and its associated fillable field will be grouped together. The appearance and text of each of the text-like features of each of the "Next' box' texts will be grouped together, etc. for later comparison to that category of examples of that key feature. As will be discussed in stage 3, after a key text-like feature is categorized, the digital signatures of each key feature can be quickly compared to a new website associated with a link undergoing analysis to determine a score of how close 'each key feature in the scanned image of, for example, the log-in page of the new website under analysis' is either to the current legitimate key features and/or how close is that 'each key feature in the scanned image of the example log-in page of the new website under analysis' to a key feature found in a known bad website.

The phishing site detector 100 can identify both a known website attempting to steal credentials from a victim as well as a previously unknown website attempting to steal credentials from a victim by performing the operations in stages 1-3. The phishing site detector 100 can detect known phishing websites by keeping a list of 'known bad' sites.

Email

In an embodiment, initially, the phishing site detector 100 detects whether a link is present or not in an email. The link in the email can be accompanied by some text with malicious and/or compelling text for example, a warning about expiring logins in Office 365. The phishing site detector 100 has the access module configured to access a link in an email to capture screen shots of at least the log-in page associated with that link. The access module runs its routine to activate the link to access the link and then screenshots the webpage that comes up. The access module feeds/supplies the screenshot to a machine learning algorithm in the segmentation module. The segmentation module applies the machine learning algorithm, such as Fully Convolutional Neural Networks for segmentation, in order to segment the scanned image. The phishing site detector 100 thus performs segment detection with the FCN.

Figure 4:
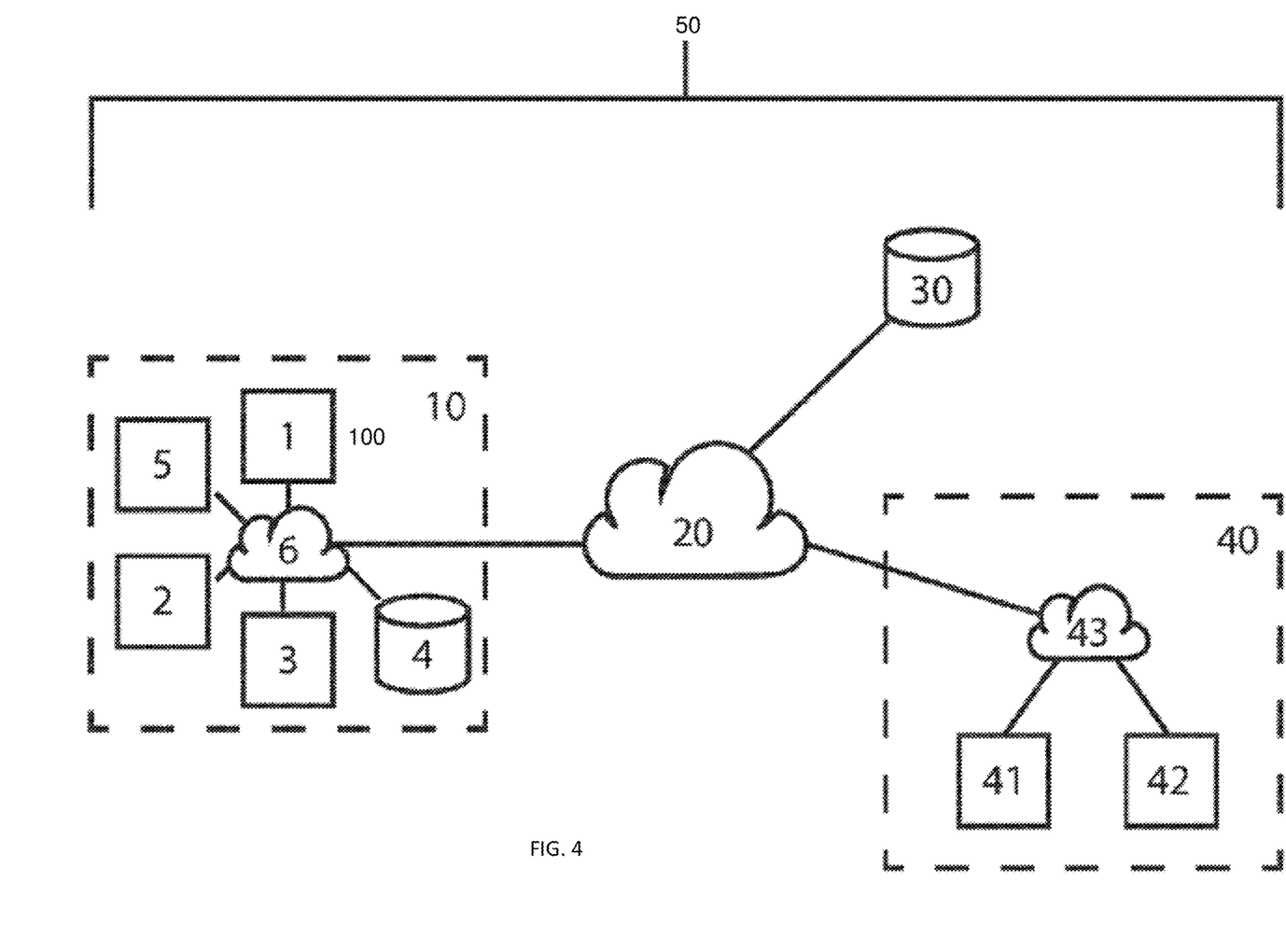
FIG. 4 illustrates a block diagram of an embodiment of a phishing site detector protecting a system, such as an email system, from phishing threats.

FIG. 4 illustrates an example phishing site detector to protect an example network. The example network of computer systems 50 uses a phishing site detector 100. The system depicted is a simplified illustration, which is provided for ease of explanation. The system 50 comprises a first computer system 10 within a building, which uses the threat detection system to detect and thereby attempt to prevent threats to computing devices within its bounds.

The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices 18 including server 30 and second computer system 40. The second computer system 40 also includes two computers 41, 42, connected by a second LAN 43.

In this exemplary embodiment of the phishing site detector 100, computer 1 on the first computer system 10 has the hardware and software of the phishing site detector 100; and therefore, runs threat detection for detecting threats to the first computer system. As such, the computer system includes one or more processors arranged to run the steps of the process described herein, memory storage components required to store information related to the running of the process, as well as a network interface for collecting the required information from the lightweight probes.

The phishing site detector 100 in computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9:30 AM and midday, and is active from about 8:30 AM until 6 PM.

The same employee virtually never accesses the employee time sheets, very rarely connects to the company's Atlanta network and has no dealings in South-East Asia. The threat detection system takes all the information that is available relating to this employee and establishes a 'pattern of life' for that person and the devices used by that person in that system, which is dynamically updated as more information is gathered. The 'normal' of the model of the normal pattern of life is used as a moving benchmark, allowing the system to spot behavior on a system that seems to fall outside of this normal pattern of life, and flags this behavior as anomalous, requiring further investigation.

The phishing site detector 100 is built to deal with the fact that today's attackers are getting stealthier and an attacker/malicious agent may be 'hiding' in a system to ensure that they avoid raising suspicion in an end user, such as by slowing their machine down.

The cyber threat defense system builds a sophisticated 'pattern of life'—that understands what represents normality for every person, device, and network activity in the system being protected by the phishing site detector 100.

The phishing site detector 100 can use unsupervised machine learning to works things out without pre-defined labels. In the case of sorting a series of different entities, such as animals, the system analyzes the information and works out the different classes of animals. This allows the system to handle the unexpected and embrace uncertainty when new entities and classes are examined. The system does not always know what it is looking for, but can independently classify data and detect compelling patterns.

The cyber security appliance's unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the phishing site detector 100 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network—even when it does not know what it is looking for.

The phishing site detector 100 can use a Recursive Bayesian Estimation. To combine these multiple analyses of different measures of network behavior to generate a single overall/comprehensive picture of the state of each device, the phishing site detector 100 takes advantage of the power of Recursive Bayesian Estimation (RBE) via an implementation of the Bayes filter.

Using RBE, the cyber security appliance's AI models are able to constantly adapt themselves, in a computationally efficient manner, as new information becomes available to the system. The cyber security appliance's AI models continually recalculate threat levels in the light of new evidence, identifying changing attack behaviors where conventional signature based methods fall down.

Training a model can be accomplished by having the model learn good values for all of the weights and the bias for labeled examples created by the system, and in this case; starting with no labels initially. A goal of the training of the model can be to find a set of weights and biases that have low loss, on average, across all examples.

An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The model representing normal behavior from a given normal training data set can detect anomalies by establishing the normal pattern and then test the likelihood of a test instance under analysis to be generated by the model. Anomaly detection can identify rare items, events or observations which raise suspicions by differing significantly from the majority of the data, which includes rare objects as well as things like unexpected bursts in activity.

The method, apparatus and system are arranged to be performed by one or more processing components with any portions of software stored in an executable format on a computer readable medium. Thus, any portions of the method, apparatus and system implemented as software can be stored in one or more non-transitory memory storage devices in an executable format to be executed by one or more processors. The computer readable medium may be non-transitory and does not include radio or other carrier waves. The computer readable medium could be, for example, a physical computer readable medium such as semiconductor memory or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit.

Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A cyber security appliance, comprising:
one or more memory storage devices;
one or more processors, coupled to the one or more memory storage devices, the one or more processors configured to cause:
a phishing site detector having a segmentation module to break up an image of a page of a site under analysis into multiple segments, transform each segment of the multiple segments into a fixed rendered size, and analyze each transformed segment of the multiple segments of the image of the page to determine visually whether a key text-like feature exists in each transformed segment of the multiple segments;
a signature creator to create a digital signature for each transformed segment containing a particular key text-like feature, wherein the digital signature for the transformed segment containing the particular key text-like feature is at least indicative of a visual appearance of the particular key text-like feature;
a trained AI model to compare digital signatures from a first set of key text-like features detected in the image of the page from an unknown site under analysis to digital signatures of a second set of key text-like features from a plurality of known bad phishing sites to output a likelihood of maliciousness of the unknown site under analysis;
wherein the segmentation module is configured to use a machine learning algorithm for breaking up and segmenting the image of the site under analysis, and wherein the machine learning algorithm is implemented in Neural Networks, where when any software instructions are implemented in the cyber security appliance, then the software instructions are stored in an executable form in the one or more memories and are configured to be executed by the one or more processors.

2. The cyber security appliance of claim 1, wherein the phishing site detector has a categorizing module to use a blended approach to analyze at least a first transformed segment of the multiple segments in the image determined to have a first key text-like feature via i) OCR text recognition and with ii) analysis of a literal visual representation from the image of that page under analysis to determine what does the first key text-like feature on the page visually look like, and then iii) use both of resulting text from the OCR text recognition and the visual appearance of the key text-like feature to determine a category that the first key text-like feature in the first transformed segment of the multiple segments of the image of the page under analysis belongs to, wherein the image of the page of the unknown site under analysis is a page that harvests log-in credentials for the unknown site.

3. The cyber security appliance of claim 1, wherein the trained AI model is trained to compare i) one or more key text-like features from the first set of key text-like features detected in the image under analysis in a particular category of features to ii) digital signatures in the same category for key text-like features from the second set of key text-like features from the known bad phishing sites stored in a library of digital signatures.

4. The cyber security appliance of claim 3, wherein the phishing site detector includes an autonomous response module configured to, upon a determination that enough key text-like features from the first set of key text-like features closely match digital signatures in the second set of key text-like features from known bad phishing sites, lock out a user's ability to access the unknown site under analysis, and generate a notice to the user that the unknown site is likely a malicious phishing site.

5. The cyber security appliance of claim 1, wherein the segmentation module is configured to detect the first set of key text-like features in the multiple segments of the image and determine coordinates around each key text-like feature.

6. The cyber security appliance of claim 5, wherein the machine learning algorithm implemented in the Neural Networks is configured to analyze the image to look for specific key features that appear text-like, including any of actual text and logos on the image of the page under analysis, by detecting gradients in color change in one or more areas and a ratio to a background color to establish a beginning and an end of each specific key feature that appears text-like, wherein these key text-like features will then have a bounding box formed around the coordinates of each key text-like feature.

7. The cyber security appliance of claim 6, wherein the phishing site detector includes a categorizing module to perform OCR text analysis on a first key text-like feature in the first set of key text-like features and an analysis of a literal visual representation on the first key text-like feature to determine the meaning the first key text-like feature is trying to convey to help catalog the first key text-like feature for a comparison, wherein each key text-like feature has its own bounding box.

8. The cyber security appliance of claim 1, wherein the trained AI model is configured to compare the digital signatures from the first set of key text-like features detected in the unknown site under analysis to the digital signatures of the second set of key text-like features of known bad phishing sites, wherein each key text-like feature is compared to another key text-like feature in that same category, to output the likelihood of maliciousness of the unknown site under analysis, wherein the page is a login page of the site under analysis.

9. The cyber security appliance of claim 1, wherein the trained AI model is configured to compare the digital signatures from the first set of key text-like features detected in the unknown site under analysis to the digital signatures of the second set of key text-like features of known bad phishing sites, wherein the phishing site detector includes has an access module that is configured to access, when an email under analysis is checked, a link in the email to capture the image of at least a login page associated with the unknown site accessed through the link.

10. The cyber security appliance of claim 9, wherein the access module is further configured to capture one or more screenshots of the page of the unknown site under analysis to create the image of at least the login page and feed the one or more screenshots to the segmentation module.

11. A method for a cyber security appliance, comprising:
breaking up an image of a page of a site under analysis into multiple segments, transforming each segment of the multiple segments into a fixed rendered size, and analyzing each transformed segment of the multiple segments of the image of the page to determine visually whether a key text-like feature exists in each transformed segment of the multiple segments;
creating a digital signature for each transformed segment containing a particular key text-like feature, wherein the digital signature for the transformed segment containing the particular key text-like feature is at least indicative of a visual appearance of the particular key text-like feature;
comparing digital signatures from a first set of key text-like features detected in the image of that page of an unknown site under analysis to digital signatures of a second set of key text-like features from a plurality of known bad phishing sites to output a likelihood of maliciousness of the unknown site under analysis;
wherein a machine learning algorithm is used for breaking up and segmenting the image of the unknown site under analysis, and wherein the machine learning algorithm is implemented in Neural Networks, where when any software instructions are implemented in the cyber security appliance, then the software instructions are stored in an executable form in one or more memories and are configured to be executed by one or more processors.

12. The method for the cyber security appliance of claim 11, further comprising:
using a blended approach to analyze at least a first transformed segment of the multiple segments in the image determined to have a first key text-like feature via i) OCR text recognition and with ii) analysis of a literal visual representation from the image of that page under analysis to determine what does the first key text-like feature on the page visually look like, and then iii) use both of resulting text from the OCR text recognition and the visual appearance of the key text-like feature to determine a category that the first key text-like feature in the first transformed segment of the multiple segments of the image of the page under analysis belongs to, wherein the image of the page of the unknown site under analysis is a log-in page for the unknown site.

13. The method for the cyber security appliance of claim 11, further comprising:

comparing i) one or more key text-like features from the first set of key text-like features detected in the image under analysis in a particular category of features to ii) digital signatures in the same category for key text-like features from the second set of key text-like features from the known bad phishing sites stored in a library of digital signatures.

14. The method for the cyber security appliance of claim 13, further comprising:

autonomously responding, upon a determination that enough key text-like features from the first set of key text-like features closely match digital signatures in the second set of key text-like features from known bad phishing sites, by locking out a user's ability to access the unknown site under analysis, and generate a notice to the user that the unknown site is likely a malicious phishing site.

15. The method for the cyber security appliance of claim 11, further comprising: detecting the first set of key text-like features in the multiple segments of the image, and determining coordinates around each key text-like feature.

16. The method for the cyber security appliance of claim 15, wherein the machine learning algorithm is configured to analyze the image to look for specific key features that appear text-like, including any of actual text and logos on the image of the page under analysis, by detecting gradients in color change in one or more areas and a ratio to a background color to establish a beginning and an end of each specific key feature that appears text-like, wherein these key text-like features will then have a bounding box formed around the coordinates of each key text-like feature.

17. The method for the cyber security appliance of claim 16, further comprising:

performing OCR text analysis on a first key text-like feature in the first set of key text-like features and an analysis of a literal visual representation on the first key text-like feature to determine the meaning the first key text-like feature is trying to convey to help catalog the first key text-like feature for a comparison, wherein each key text-like feature has its own bounding box.

18. The method for the cyber security appliance of claim 11, further comprising:

comparing the digital signatures from the first set of key text-like features detected in the unknown site under analysis to the digital signatures of the second set of key text-like features of known bad phishing sites, wherein each key text-like feature is compared to another key text-like feature in that same category, to output the likelihood of maliciousness of the unknown site under analysis, wherein the page is a login page of the site under analysis, and wherein the comparison uses an L2 norm.

19. The method for the cyber security appliance of claim 11, further comprising:

comparing the digital signatures from the first set of key text-like features detected in the unknown site under analysis to the digital signatures of the second set of key text-like features of known bad phishing sites; and accessing, when an email under analysis is checked, a link in the email to capture the image of at least a login page associated with the unknown site accessed through the link.

20. The method for the cyber security appliance of claim 19, further comprising:

capturing one or more screenshots of the page of the unknown site under analysis to create the image of at least the login page and feeding the one or more screenshots for segmentation.

* * * * *